No. 677,418. Patented July 2, 1901.
G. & J. G. L'ESPREANCE.
LIMEKILN.
(Application filed Oct. 26, 1900.)
(No Model.)
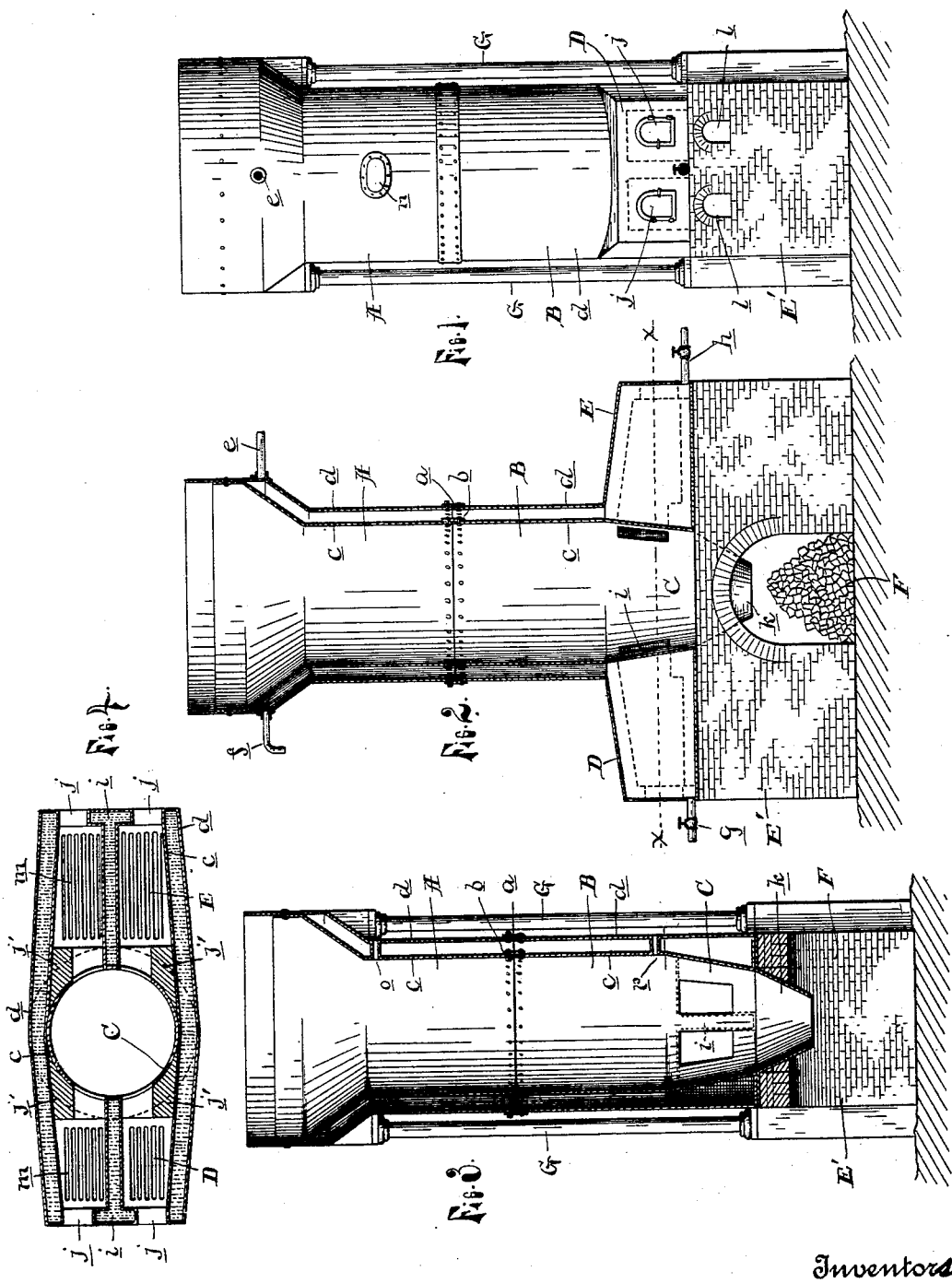
Witnesses
Lewis E. Flanders
Joseph A. Noelke
Inventors
Gilbert L'Espreance
John G. L'Espreance
Attorneys.

UNITED STATES PATENT OFFICE.

GILBERT L'ESPREANCE AND JOHN G. L'ESPREANCE, OF DETROIT, MICHIGAN.

LIMEKILN.

SPECIFICATION forming part of Letters Patent No. 677,418, dated July 2, 1901.

Application filed October 26, 1900. Serial No. 34,423. (No model.)

*To all whom it may concern:*

Be it known that we, GILBERT L'ESPREANCE and JOHN G. L'ESPREANCE, citizens of the United States of America, residing at Detroit, in the county of Wayne and State of Michigan, have invented certain new and useful Improvements in Limekilns, of which the following is a specification, reference being had therein to the accompanying drawings.

This invention relates to new and useful improvements in kilns for burning lime-rock, and has for its object to produce a portable kiln which will not readily burn out and will cook the lime evenly throughout and at the same time produce a pure lime especially adapted for glass manufacturers. With the ordinary limekiln in which brick or stone is used the limestones of the charge and the bricks contained in the wall will adhere to each other when the mass becomes heated, and as a result will pull out the bricks in the wall as the mass slowly descends, thereby necessitating the frequent repairing of the kiln and at the same time mixing foreign ingredients with the lime, which greatly lowers the quality of the same, and, further, with a brick or stone kiln the walls soon become heated and as a result the lime cooks much faster near the walls than in the center, producing an article of varying grade, while with our construction the walls are constantly kept at a temperature so that the lime is cooked equally throughout, thus producing a superior article. To this end the kiln consists of a substructure or ash-pit section and a superstructure of iron detachably supported thereon, provided with a water-jacket extending from the bottom to near the top of the superstructure in contact with the inner wall thereof and means for feeding the water therethrough, all substantially as shown and described in the accompanying specification and drawings, in which—

Figure 1 is an end elevation of the limekiln. Fig. 2 is a vertical central section through the superstructure at right angles to Fig. 1, showing the base in elevation. Fig. 3 is a vertical central section at right angles to Fig. 2 through the superstructure. Fig. 4 is a section on line $x$ $x$, Fig. 2.

As shown in the drawings, the stack or flue is preferably constructed in two or more sections A B, of which A is the upper section and B the lower section, detachably united together at their meeting ends by means of circumferential plates $a$ $b$ to form a water-tight joint, each section being provided with an inner and outer wall $c$ $d$, preferably extending from the bottom to near the top of the superstructure and forming between them a water-space, the whole of the superstructure, including the furnace-chambers at the base, being made with a water-jacket to protect the iron and maintain the walls at a uniform temperature, cold water being admitted in at the top through the pipe $e$, as desired, part overflowing through the overflow-pipe $f$ and part running out at the bottom through the valved pipes $g$ $h$. The inner and outer walls of the kiln are suitably braced by stay-bolts in the same manner as used in boiler construction.

The lower portion of the stack or flue is conically contracted at C, as shown, to prevent the burnt lime from being fed down too fast, and D E are the furnace-chambers, preferably integrally formed with the upright cylindrical portion at or near its lower end, the entire furnace-chamber being water-jacketed, including the central partition or supporting-wall $i$.

$j$ represents the furnace-door openings, also surrounded by water, and $j'$ represents the bridge-walls for the furnace, which may be made integral with the superstructure or built up from the ash-pit, as shown.

The superstructure is set upon a suitable brick or stone foundation E', provided with arched openings F, from which the burnt lime is removed as it is discharged by the hopper $k$.

$l$ represents the ash-pit doors, and $m$ the grates for the furnace, while G represents vertical supporting-columns adapted to set on top of the foundation to support the receiving-hopper of the kiln, although the use of these columns may be dispensed with.

$n$ is a manhole in the side of the kiln for the purpose of interior access, and $o$ $p$ are peep-holes near the top and bottom of the kiln, respectively, and also for the purpose of inserting a rod therein to loosen the limestone should they become lodged.

It will also be seen that with the use of the central wall $i$ and fire-wall $j'$ the lime is prevented from falling into the furnace-chambers, as the openings are not of such a size as would readily admit the limestone, which would be the case if said walls were dispensed with, said walls at the same time acting to support the lower end of the kiln. With our construction the cost of building and maintaining such a kiln is greatly reduced, and should it not be profitable to operate the kiln at one place by reason of failure of the supply or market it can be quickly taken down, loaded on the cars, and shipped to such location where the material is at hand and the market good.

Having thus fully described our invention, what we desire to secure by Letters Patent is—

1. A limekiln composed of a substructure of brick extending up and forming the ash-pit section and a superstructure removably supported thereon and composed of an enlarged base-section forming the furnace-chamber, and a stack or flue supported on the base-section having its lower end surrounded by the same, the stack and base-section being composed of inner and outer walls of sheet-iron forming between them a water-space continuous throughout the whole and in contact with the inner wall of the structure and means for circulating water through said water-space.

2. A limekiln consisting of the ash-pit section of brick and a superstructure supported thereon and integrally composed of a lower or base section forming the combustion-chamber and a stack having a contracted portion at or near the lower end, said base-section and stack being formed with inner and outer walls of sheet-iron forming a space between them continuous throughout the whole and forming a water-jacket in contact with the whole of the inner wall of the structure and means for supplying water thereto.

3. A limekiln composed of an ash-pit section of brick and a stack removably supported upon said ash-pit section, said stack being formed of an inner and an outer concentric wall of iron extending from near the bottom to near the top thereof to form a continuous water-chamber around the stack and adapted to protect the inner wall of the stack, having suitable inlets and outlets for the water contained therein, and furnace-chambers adjacent to and communicating with the interior of the stack, at or near the base thereof.

4. In a limekiln, the combination with a substructure of brick forming the ash-pit section and the vertical bottom outlet of the kiln, of a stack formed of a single structure of iron removably supported thereon, said stack being formed of concentric inner and outer walls forming between them a hollow space continuous throughout the stack from the bottom to near the top and constituting a water-jacket around the whole of the inner wall of the structure, provided with suitable inlet and outlet pipes to maintain the water therein said stack having furnace-chambers on opposite sides of the base adjacent to and communicating with the interior of the stack.

5. In a limekiln, the combination with a substructure of brick forming the ash-pit section and adapted for the removal of the burnt lime from the bottom, of a superstructure removably supported thereon and forming a single portable structure, comprising a stack formed of concentric inner and outer walls forming between them a water-space and furnace-chambers on opposite sides of the stack formed of inner and outer walls forming between them a water-space communicating with the water-space of the stack and means for feeding and regulating the flow of water through said space.

6. In a limekiln, the combination with a substructure of brick forming the ash-pit section and adapted for the removal of the burnt lime, of a superstructure removably supported thereon composed of an upper and lower section detachably secured together at their meeting ends and comprising a hopper at its upper end, a discharge-hopper and furnace-chambers at its lower end, and a stack or flue intermediate said ends, said stack and furnace-chamber being composed of an inner and outer wall forming between them a space constituting a water-jacket around the whole of the inner wall of the structure, provided with suitable inlet and outlet pipes to maintain the water therein.

7. In a limekiln, the combination with a substructure of brick forming the ash-pit section and adapted for the removal of the burnt lime, of a superstructure removably supported thereon, comprising a stack formed of concentric inner and outer walls forming between them a water-space and furnace-chambers on opposite sides of the stack formed of inner and outer walls forming between them a water-space communicating with the water-space of the stack, and a vertical central hollow partition-wall forming a water-space dividing each of said furnace-chambers into two compartments opening into said stack and means for supplying water to said water-space.

8. In a limekiln for burning lime, the combination with the supporting-base of the superstructure removably mounted thereon comprising the stack portion having a hopper at its upper end and contracted portion C at its lower end, lateral furnace-chambers D E on opposite sides of said contracted portion of the stack and communicating therewith, said stack and furnace-chambers being composed of the inner and outer walls $c$ $d$ forming a water-space between the same, the supply and discharge pipes $e$ $f$ communicating with said water-space and the peep-holes $o$ $p$ connecting said inner and outer walls through said water-space.

In testimony whereof we affix our signatures in presence of two witnesses.

GILBERT L'ESPREANCE.
JOHN G. L'ESPREANCE.

Witnesses:
OTTO F. BARTHEL,
JOSEPH A. NOELKE.